United States Patent Office 3,773,941
Patented Nov. 20, 1973

3,773,941
INSECTICIDAL COMPOSITIONS COMPRISING 1,4-DITHIACYCLOHEPTYLIDEN - 6 - IMINYL CARBAMATES AND METHODS OF USING THE SAME
Ranajit Ghosh, Nigel Douglas Bishop, and Frederick Charles Peacock, Bracknell, England, assignors to Imperial Chemical Industries Limited, London, England
No Drawing. Original application Dec. 2, 1968, Ser. No. 780,590, now Patent No. 3,661,930, dated May 9, 1972. Divided and this application Oct. 19, 1970, Ser. No. 82,207
Claims priority, application Great Britain, Dec. 4, 1967, 55,062/67
Int. Cl. A01n 9/12
U.S. Cl. 424—277
6 Claims

ABSTRACT OF THE DISCLOSURE

Insecticidal compositions and methods of using the same wherein the active ingredient is a carbamoyl oxime such as

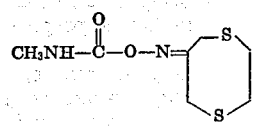

and

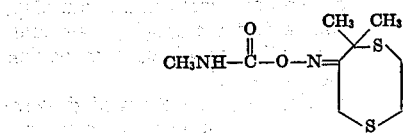

This application is a division of Ser. No. 780,590, filed Dec. 2, 1968 and now U.S. Pat. 3,661,930.

This invention relates to new organic compounds and compositions containing them. More particularly the invention relates to new carbamoyloximes and pesticidal compositions containing them.

According to the present invention we provide new compounds having the general formula:

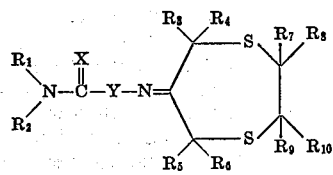

wherein $R_1$ to $R_{10}$ are hydrogen atoms or hydrocarbon groups, or $R_1$ and $R_2$ together with the adjacent nitrogen atom form a heterocyclic ring and $R_3$ to $R_{10}$ are hydrogen atoms or hydrocarbon groups; and X and Y are atoms of sulphur or oxygen.

When $R_1$ and $R_2$ together with the adjacent nitrogen atom form a heterocyclic ring, this ring may include additional hetero atoms.

Preferred compounds included within the scope of this invention are those wherein the above general formula $R_1$ to $R_{10}$ are hydrogen atoms or alkyl groups.

Specific compounds within the scope of the invention have the structural formulae set out in Table I below:

TABLE I

| Compound No. | Structural formula | Physical properties, M.P. °C. |
|---|---|---|
| 1 | CH₃NH—C(=O)—O—N=⟨S-S⟩ (7-ring) | 113 |
| 2 | CH₃NH—C(=O)—O—N=⟨S-S, CH₃ CH₃⟩ | 103-4 |
| 3 | CH₃NH—C(=O)—O—N=⟨S-S⟩—CH₃ | 116 |
| 4* | CH₃NH—C(=O)—O—N=⟨S-S, CH₃ CH₃, H, H, CH₃⟩ | 129 |
| 5 | CH₃CH₂NH—C(=O)—O—N=⟨S-S⟩ | 126 |
| 6 | C₆H₅—NH—C(=O)—O—N=⟨S-S⟩ | 169 |
| 7 | Cl-C₆H₄—NH—C(=O)—O—N=⟨S-S⟩ | 128 |
| 8 | naphthyl—NH—C(=O)—O—N=⟨S-S⟩ | 165 |
| 9 | CH₃NH—C(=O)—O—N=⟨S-S, CH₃⟩ | 145-6 |
| 10 | CH₃NH—C(=O)—O—N=⟨S-S, CH₃, CH₃⟩ | 98 |
| 11 | C₆H₅—NH—C(=S)—O—N=⟨S-S⟩ | 148-9 |

*It has not been established whether this compound is a 2,5,5; or 3,5,5, trimethyl derivative.

The invention compounds may be prepared by reacting the appropriate ketone with hydroxylamine to form an oxime which may be carbamoylated either by (i) reacting the oxime with an isocyanate or an isothiocyanate of formula: R₁NCX where $R_1$ is a hydrocarbon group and X has any of the meanings stated above, conveniently in the presence of a small quantity of a base and/or a solvent, or (ii) reacting the oxime, or a salt thereof, with a carbamoyl halide or thiocarbamoyl halide of formula:

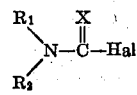

wherein $R_1$, $R_2$ and X have any of the meanings stated above and Hal represents an atom of a halogen, if necessary in the presence of a base and/or a solvent, (iii) reacting the corresponding imino-halide of the oxime with an ammonium salt or a metal salt of a thiol- or dithiocarbamic acid of formula:

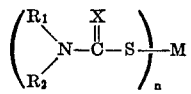

wherein $R_1$, $R_2$ and X have any of the meanings stated above; M is an ammonium ion and $n$ has the value 1, or M is a metal ion of valency $n$ where $n$ is 1, 2 or 3, or (iv) the oxime is reacted with phosgene, conveniently in the presence of a base and/or a solvent, and the reaction product is subsequently reacted with an amine of the formula $R_1R_2NH$, where $R_1$ and $R_2$ have any of the meanings stated above. In reaction (iii) M is suitably an ion of an alkali metal or alkaline earth metal.

Suitable bases for the above reactions are tertiary amines, for example triethylamine, N-methylmorpholine and pyridine. Suitable solvents are, for example, benzene, ether, light petroleum and pyridine.

The compounds of this invention are very toxic towards a variety of insect pests including the following:

*Tetranychus telarius* (red spider mites—adults and eggs)
*Aphis fabae* (black aphids)
*Aedes aegypti* (mosquito larvae)
*Megoura viciae* (green aphids)
*Pieris brassicae* (white butterfly)
*Phaedon cochleariae* (mustard beetle)
*Meloidogyne incognita* (nematodes)
*Musca domestica* (housefly)

A particularly useful feature of the activity of the invention compounds is their ability to act as systemic pesticides, that is to say, their ability to move throughout a plant to reach other parts thereof and to combat infestations thereon. Thus a compound of the invention, or a composition containing the same, may be applied to the soil surrounding the roots of a plant and taken up into the plant by its roots to combat pests on the plant; or be applied to the leaves and taken down throughout the plant to combat root feeding pests.

The following mammalian toxicities expressed as $LD_{50}$ values on rats have been recorded:

|  | Intraperitoneal, mg./kg. | Oral, mg./kg. |
|---|---|---|
| Compound No. 1 of Table I | 50-100 | 400-800 |

NOTE.—Mg./kg.=Milligrams of compound per kilogram of live rat body weight. Intraperitoneal=Intraperitoneal injection of rat with compound. Oral=Oral administration of compound to rat.

The invention further consists in pesticidal compositions comprising as an active ingredient a compound having the general formula:

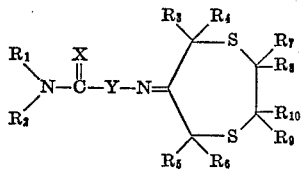

wherein $R_1$ to $R_{10}$ are hydrogen atoms or unsubstituted or substituted hydrocarbon groups and additionally $R_1$ and $R_2$ together with the adjacent nitrogen atom may form a heterocyclic ring; and X and Y are atoms of sulphur or oxygen.

More specifically the invention includes compositions comprising as an active ingredient a compound of the above general formula wherein $R_1$ to $R_{10}$ are hydrogen atoms or alkyl groups; and X and Y are oxygen atoms.

Compounds particularly useful as an active ingredient in the compositions of this invention are those specifically enumerated above.

In use, the invention compounds, or compositions containing them, may be applied in a variety of ways. Thus their application can suitably be directed onto the foliage of the plant or to infested areas thereof; alternatively the soil surrounding the plant can be treated with the invention compounds or compositions containing them. If desired the seeds themselves can be similarly treated.

According to a further feature therefore we provide a method of combating undesired pests on plants which comprises applying to the locus of the plant, a carbamoyloxime compound or composition as hereinbefore defined.

In a further aspect the invention provides a method of combating pests on plants which comprises applying to the plants or to seeds thereof a carbamoyloxime compound or composition as hereinbefore defined. The invention further includes a method of treating agricultural soil comprising applying to the soil a carbamoyloxime compound or a composition as hereinbefore defined.

In a yet further aspect the invention includes a method of combating pests which comprises applying to the pests or to a pest habitat a compound or composition as hereinbefore defined.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolin, bentonite, kieselguhr, dolomite, calcium carbonate, talc, powdered magnesia, fuller's earth, gypsum, Hewitt's earth, diatomaceous earth and china clay. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate; salts of sulphonated aromatic compounds, for example sodium dodecylbenzenesulphonate; sodium, calcium or ammonium lignosulphonate, butylnaphthalene sulphonate, and a mixture of the sodium salts of diisopropyl- and triisopropylnaphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins.

Suitable suspending agents are, for example, hydrophilic colloids, for example polyvinylpyrrolidone and sodium carboxymethylcellulose, and the vegetable gums, for example acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive power and resistance to rain on treated surfaces, the different compositions can be better adapted for the various uses for which they are intended.

The carbamoyloxime compounds may also be conveniently formulated by admixing them with fertilizers. A preferred composition of this type comprises granules of fertilizer material incorporating, for example coated with, a carbamoyloxime derivative. The fertilizer material, may, for example, comprise nitrogen or phosphate-containing substances.

In yet a further aspect of the invention, therefore, we provide a fertilizer comprising a carbamoyloxime compound as hereinbefore defined.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10-85% by weight of the active ingredient or ingredients, and generally from 25-60% by weight of the active ingredient or ingredients. When diluted to form aqueous preparations, such preparations may contain varying amounts of the active ingredient or ingredients depending upon the purpose for which they are to be used, but an aqueous preparation containing between 0.0001% and 10.0% by weight of active ingredient or ingredients may be used.

It is to be understood that the compositions of this invention may comprise, in addition to a carbamoyloxime compound, one or more other compounds having biological activity.

The invention is illustrated, but not limited, by the following examples.

EXAMPLE 1

This example illustrates the preparation of 1,4-dithiacycloheptyliden-6-iminyl N-methyl-carbamate, having the structure:

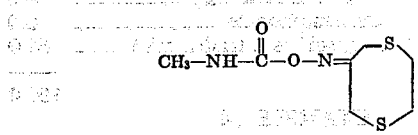

To a solution of 1,4-dithiacycloheptan-6-one (10.8 g.) in benzene (250 cc.) was added methyl isocyanate (4 cc.) and 3 drops of N-methyl morpholine and the mixture kept at room temperature for 48 hours. After this period the benzene was removed by evaporation under reduced pressure and the residual solid recrystallised from ethanol to yield 1,4-dithiacycloheptyliden-6-iminyl N-methyl-carbamate as a white solid, M.P. 113° C.

EXAMPLE 2

This example illustrates the preparation of 1,4-dithia-5,5-dimethylcycloheptyliden - 6 - iminyl N-methyl-carbamate, having the structure:

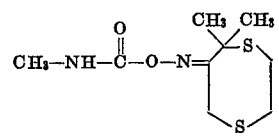

The procedure of Example 1 was followed except that the oxime of 1,4-dithia-5,5-dimethylcycloheptan-6-one was used in place of the oxime of 1,4-dithiacycloheptan-6-one. 1,4-dithia-5,5-dimethylcycloheptyliden-6-iminyl N-methyl-carbamate was obtained as a white solid, M.P. 103–104° C.

EXAMPLE 3

This example illustrates the preparation of 2-methyl-1,4 - dithiacycloheptyliden-6-iminyl N-methyl-carbamate, having the structure:

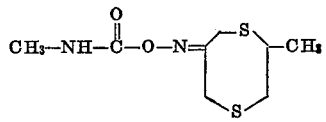

The procedure of Example 1 was followed except that the oxime of 2-methyl-1,4-dithiacycloheptan-6-one was used in place of the oxime of 1,4-dithiacycloheptan-6-one. 2-methyl - 1,4 - dithiacycloheptyliden-6-iminyl N-methyl-carbamate was obtained as a crystalline white solid, M.P. 116° C.

EXAMPLE 4

This example illustrates the preparation of 2 (or 3), 5,5 - trimethyl-1,4-dithiacycloheptylidin-6-iminyl N-methyl carbamate having one of the structures:

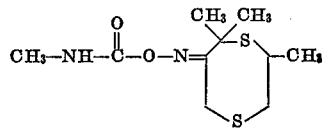

or

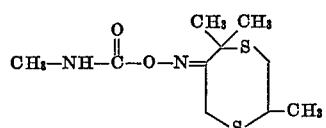

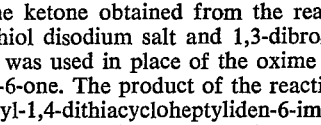

The procedure of Example 1 was followed except that the oxime of the ketone obtained from the reaction of propane-1,2-dithiol disodium salt and 1,3-dibromo-3-methyl-butan-2-one was used in place of the oxime of 1,4-dithia-cycloheptan-6-one. The product of the reaction, 2 (or 3), 5,5 - trimethyl-1,4-dithiacycloheptyliden-6-iminyl N-methyl-carbamate, was obtained as a white crystalline solid, M.P. 129° C. after recrystallisation from ethanol.

EXAMPLE 5

This example illustrates the preparation of 1,4-dithiacycloheptyliden-6-iminyl N-ethyl-carbamate having the structure:

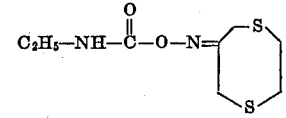

The procedure of Example 1 was followed except that ethyl isocyanate was used in place of methyl isocyanate. 1,4-dithiacycloheptyliden-6-iminyl N-ethyl-carbamate was obtained as a white crystalline solid, M.P. 126° C., after recrystallisation from ethanol.

EXAMPLE 6

This example illustrates the preparation of 1,4-dithiacycloheptyliden-6-iminyl N-phenyl-carbamate, having the structure:

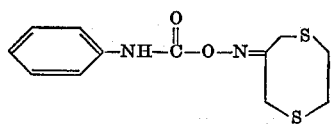

The procedure of Example 1 was followed except that phenyl isocyanate was used in place of methyl isocyanate. 1,4-dithiacycloheptyliden-6-iminyl N-phenyl-carbamate was obtained as a white crystalline solid, M.P. 169° C., after recrystallisation from ethanol.

EXAMPLE 7

This example illustrates the preparation of 1,4-dithiacycloheptyliden-6-iminyl N-3-chlorophenyl-carbamate, having the structure:

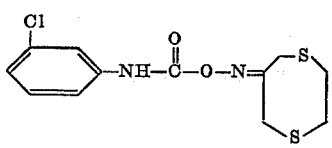

The procedure of Example 1 was followed except that 3-chlorophenyl isocyanate was used in place of methyl isocyanate. 1,4-dithiacycloheptyliden-6-iminyl N-3-chlorophenyl-carbamate was obtained as a white solid, M.P. 128° C., after recrystallisation from ethanol.

EXAMPLE 8

This example illustrates the preparation of 1,4-dithiacycloheptyliden-6-iminyl N-1-naphthyl-carbamate having the structure:

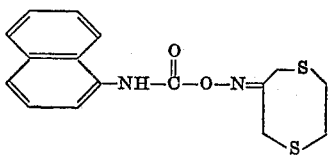

The procedure of Example 1 was followed except that 1-isocyanatonaphthalene was used in place of methyl isocyanate. 1,4-dithiacycloheptyliden-6-iminyl N-1-naphthyl-carbamate was obtained as a white crystalline solid, M.P. 165° C. after recrystallisation from ethanol.

EXAMPLE 9

This example illustrates the preparation of 5-methyl-1,4-dithiacycloheptyliden-6-iminyl N-methylcarbamate having the structure:

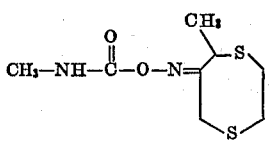

The procedure of Example 1 was followed except that the oxime of 5-methyl-1,4-dithiacycloheptan-6-one was used in the place of the oxime of 1,4-dithiacycloheptan-6-one. 5-methyl-1,4-dithiacycloheptyliden-6-iminyl N-methyl carbamate was obtained as a white solid having a melting point of 145–6° C. after recrystallisation from ethanol.

EXAMPLE 10

This example illustrates the preparation of 5,7-dimethyl-1,4-dithiacycloheptyliden-6-iminyl N-methylcarbamate having the structure:

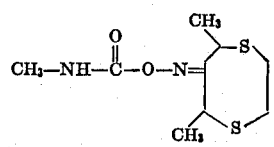

The procedure of Example 1 was followed except that the oxime of 5,7-dimethyl-1,4-dithiacycloheptan-6-one was used in the place of the oxime of 1,4-dithiacycloheptan-6-one. 5,7-dimethyl-1,4-dithiacycloheptyliden-6-iminyl N-methylcarbamate was obtained as a white solid having a melting point of 98° C. after recrystallisation from ethanol.

EXAMPLE 11

This example illustrates the preparation of 1,4-dithiacycloheptyliden-6-iminyl N-phenylthionocarbamate having the structure:

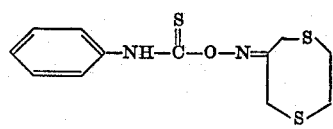

The procedure of Example 1 was followed except that phenyl isothiocyanate was used in place of methyl isocyanate. 1,4-dithiacycloheptyliden-6-iminyl N-phenylthionocarbamate was obtained as a pale yellow crystalline solid having a melting point of 148–9° C. after recrystallisation from ethanol.

The following examples are illustrative of the compositions according to the invention.

EXAMPLE 12

This example illustrates a concentrate comprising a miscible oil which is readily convertible by dilution with water into a liquid preparation suitable for spraying purposes. The concentrate has the following composition:

| | Percent wt. |
|---|---|
| Compound No. 1 of Table I | 25.0 |
| "Lubrol" L (alkylphenol/ethylene oxide condensates; "Lubrol" is a trademark) | 2.5 |
| Calcium dodecylbenzenesulphonate | 2.5 |
| "Aromasol" H (alkylbenzene solvent; "Aromasol" is a trademark) | 70.0 |
| | 100.0 |

EXAMPLE 13

This example illustrates a concentrate which is in the form of a miscible oil. The composition of this concentrate is as follows:

| | Percent wt. |
|---|---|
| Compound No. 1 of Table I | 25.0 |
| "Lubrol" I ("Lubrol" is a trademark) | 4.0 |
| Calcium dodecylbenzenesulphonate | 6.0 |
| "Aromasol" H ("Aromasol" is a trademark) | 65.0 |
| | 100.0 |

EXAMPLE 14

This example illustrates a wettable powder having the following composition:

| | Percent wt. |
|---|---|
| Compound No. 1 of Table I | 25.0 |
| Sodium silicate | 5.0 |
| Calcium lignosulphonate | 5.0 |
| China clay | 65.0 |
| | 100.0 |

EXAMPLE 15

This example illustrates an atomisable fluid comprising a mixture consisting of 25% by weight of compound No. 1 of Table I and 75% by weight of xylene.

EXAMPLE 16

This example illustrates a dusting powder which may be applied directly to plants or other surfaces and comprises 1% by weight of compound No. 1 of Table I and 99% by weight of talc.

EXAMPLE 17

25 parts by weight of the product described in Example 1, 65 parts by weight of xylene, and 10 parts of an alkyl aryl polyether alcohol ("Triton" X–100; "Triton" is a trademark) were mixed in a suitable mixer. There was thus obtained an emulsion concentrate which can be mixed with water to produce an emulsion suitable for use in agricultural applications.

EXAMPLE 18

5 parts by weight of the product described in Example 1 were thoroughly mixed in a suitable mixer with 95 parts by weight of talc. There was thus obtained a dusting powder.

EXAMPLE 19

10 parts by weight of the product described in Example 1, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing water, gave an aqueous dispersion suitable for application as a spray in the control of insect pests.

EXAMPLE 20

This example illustrates a concentrated liquid formulation in the form of an emulsion. The ingredients listed below were mixed together in the stated proportions and the whole stirred until the constituents were dispersed.

|  | Percent wt. |
|---|---|
| Compound No. 1 of Table I | 20 |
| "Lubrol" L ("Lubrol" is a trademark) | 17 |
| Calcium dodecylbenzenesulphonate | 3 |
| Ethylene dichloride | 45 |
| "Aromasol" H ("Aromasol" is a trademark) | 15 |
|  | 100 |

EXAMPLE 21

The ingredients listed below were ground together in the proportions stated to produce a powdered mixture readily dispersible in liquids.

|  | Percent wt. |
|---|---|
| Compound No. 1 of Table I | 50 |
| Dispersol T ("Dispersol" is a trademark) | 5 |
| China clay | 45 |
|  | 100 |

EXAMPLE 22

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|  | Percent wt. |
|---|---|
| Compound No. 2 of Table I | 50 |
| Dispersol T | 12.5 |
| Calcium lignosulphonate | 5 |
| Sodium dodecylbenzenesulphonate | 12.5 |
| Sodium acetate | 20 |
|  | 100 |

EXAMPLE 23

A composition suitable for use as a seed dressing was prepared by mixing all three of the ingredients set out below in the proportions stated.

|  | Percent wt. |
|---|---|
| Compound No. 1 of Table I | 80 |
| Mineral oil | 2 |
| China clay | 18 |
|  | 100 |

EXAMPLE 24

A granular composition was prepared by dissolving the active ingredient in a solvent, spraying the solution obtained onto the granules of pumice and allowing the solvent to evaporate.

|  | Percent wt. |
|---|---|
| Compound No. 2 of Table I | 5 |
| Pumice granules | 95 |
|  | 100 |

EXAMPLE 25

An aqueous dispersion formulation was prepared by mixing and grinding the ingredients recited below in the proportions stated.

|  | Percent wt. |
|---|---|
| Compound No. 1 of Table I | 40 |
| Calcium lignosulphonate | 10 |
| Water | 50 |
|  | 100 |

The toxicity of a number of the compounds of this invention towards a variety of insect pests was investigated and the tests conducted and results obtained are set out below. The compounds of the invention were in each case used in the form of a liquid preparation containing 0.1% by weight of the compound. The preparations were made by dissolving each of the compounds in a mixture of solvents consisting of 1 part by volume of acetone and 1 part by volume of ethyl alcohol. The solutions were then diluted with water containing 0.01% by weight of a wetting agent sold under the trade name of "Lissapol" NX until the liquid preparations contained the required concentration of the compound ("Lissapol" is a trademark).

The test procedure adopted with regard to each test insect was basically the same and comprised supporting a number of the insects on some medium which may be a host plant or some foodstuff on which the insect feeds, and treating either or both the insect and the medium with the preparations. The mortality of the insects was then assessed at periods varying from one to three days after the treatment.

The results of the tests are given below in Table II. In this table the first column indicates the compound used. Each of the subsequent columns indicates the name of the test insect, the host plant or medium on which it was supported, and the number of days which were allowed to elapse after treatment before assessing the percentage of insects which had been killed. The assessment is expressed in integers which range from 0 to 3.

0 represents less than 30% kill
1 represents from 30–49% kill
2 represents from 50–90% kill
3 represents over 90% kill The concentration of the invention compound in the solutions used was 1,000 parts per million for all the pests except in the cases of *Aedes aegypti* and *Meloidogyne incognita* when the concentration of the invention compound in the solution used was 10 parts and 100 parts per million, respectively.

TABLE II

| | Aedes aegypti | Aphis fabae | Megoura viciae | Tetranychus telarius | | Phaedon cochleariae | Pieris brassicae | Meloidogyne incognita |
|---|---|---|---|---|---|---|---|---|
| | Mosquito larvae | Black aphid | Green aphid | Red spider mite | Red spider egg | Mustard beetle | Cabbage white butterfly | Root knot nematode |
| | Water | Broad bean | | French bean | | Mustard/ paper | Cabbage | water |
| Days | 1 | 2 | 2 | 3 | 3 | 2 | 1 | 2 |
| Compound No.: | | | | | | | | |
| 1 | 0 | 3 | 3 | 3 | 3 | 0 | 0 | 3 |
| 2 | 3 | 3 | 3 | 3 | 3 | 1 | 3 | 3 |
| 3 | 0 | 3 | 3 | 0 | 0 | 0 | 0 | 0 |
| 4 | 0 | 3 | 3 | 1 | 1 | 0 | 0 | 0 |
| 5 | 3 | 3 | 3 | 2 | 0 | 0 | 0 | 3 |
| 6 | 3 | 0 | 0 | 0 | 0 | 0 | 0 | 0 |
| 7 | 3 | 0 | 0 | 0 | 0 | 0 | 0 | 0 |
| 8 | 3 | 0 | 0 | 0 | 0 | 0 | 0 | 0 |
| 9 | 0 | 3 | 3 | 3 | 0 | 0 | 0 | 2 |
| 10 | 0 | 3 | 3 | 3 | 0 | 0 | 0 | 0 |

We claim:

1. An insecticidal composition for plant insects comprising, as the active ingredient, an insecticidally effective amount of a compound selected from the group consisting of:

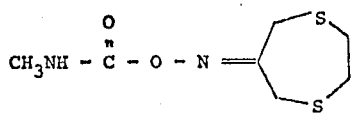

and

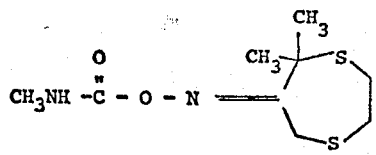

together with an agriculturally and horticulturally acceptable insecticide carrier.

2. The composition of claim 1 wherein the active ingredient is:

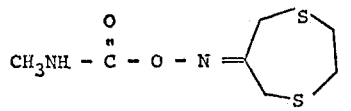

3. The composition of claim 1 wherein the carrier is a liquid carrier including a wetting agent.

4. The composition of claim 1 comprising from 0.0001% to 85% by weight of the active ingredient.

5. A method of combating plant insects which comprises applying to the plant habitat thereof or to the soil in which said plant is growing an insecticidally effective amount of a compound selected from the group consisting of:

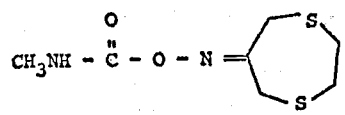

and

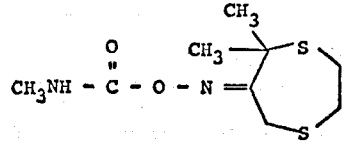

6. The method of claim 5 wherein the compound is:

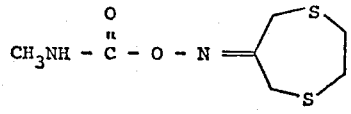

References Cited

UNITED STATES PATENTS 3,661,930   5/1972   Ghosh et al. _____ 260—327 R
3,256,330   6/1966   Kilsheimer et al. ____ 260—566

OTHER REFERENCES

Morrison et al.: Organic Chemistry, Allyn and Bacon, (1965), p. 692.

ALBERT T. MEYERS, Primary Examiner

L. SCHENKMAN, Assistant Examiner